(12) United States Patent
Lee et al.

(10) Patent No.: US 7,519,068 B2
(45) Date of Patent: Apr. 14, 2009

(54) SYSTEM FOR EMBODYING PROTOCOL IN GATEWAY GPRS SUPPORTING NODE AND METHOD THEREOF

(75) Inventors: Seung-Que Lee, Daejeon (KR); Nam-Hoon Park, Daejeon (KR); Dae-Sik Kim, Daejeon (KR); Choong-Ho Cho, Chungcheongnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 374 days.

(21) Appl. No.: 10/539,731

(22) PCT Filed: Dec. 30, 2002

(86) PCT No.: PCT/KR02/02499

§ 371 (c)(1),
(2), (4) Date: Oct. 25, 2005

(87) PCT Pub. No.: WO2004/057838

PCT Pub. Date: Jul. 8, 2004

(65) Prior Publication Data

US 2006/0104258 A1   May 18, 2006

(30) Foreign Application Priority Data

Dec. 20, 2002   (KR)   ............... 10-2002-0081677

(51) Int. Cl.
*H04L 12/28*   (2006.01)
(52) U.S. Cl. ............. 370/395.52; 370/466; 370/469; 370/497
(58) Field of Classification Search ............. 370/352, 370/466, 469, 497, 395.5, 395.52
See application file for complete search history.

(56) References Cited

U.S. PATENT DOCUMENTS 5,970,059 A   10/1999   Ahopelto et al.

(Continued)

FOREIGN PATENT DOCUMENTS

EP   1246479   10/2002

(Continued)

OTHER PUBLICATIONS

Seung Que Lee, et al; "A Simple Structure of Protocol Block for GGSN Implementing With One IP Layer", The 6th Next Generation Communication Software NCS 2002, pp. 701-705.

*Primary Examiner*—Seema S Rao
*Assistant Examiner*—Sai-Ming Chan
(74) *Attorney, Agent, or Firm*—Ladas & Parry LLP

(57) ABSTRACT

Disclosed is a protocol embodying system and method in the GGSN. An IP layer is provided between the GPRS network and the PDN and performs routing between the two networks, and performs routing between the protocols of the first and second network layers and the transfer layer protocol on the GPRS network. A virtual driver is provided on the lower part of the IP layer, is connected to the protocol of the GPRS tunneling provided to the upper part of the IP layer on the GPRS network, and is operable as the lower interface of the IP layer. Since the upper part and the lower part of the IP are appropriately connected by the virtual driver, a single IP is needed in the system, and the embodied configuration becomes simpler.

9 Claims, 2 Drawing Sheets

U.S. PATENT DOCUMENTS

| | | |
|---|---|---|
| 6,233,458 B1 | 5/2001 | Haumont et al. |
| 6,389,008 B1 | 5/2002 | Lupien et al. |
| 6,487,406 B1 | 11/2002 | Chang et al. |
| 2002/0141393 A1* | 10/2002 | Eriksson et al. ............. 370/352 |
| 2003/0002480 A1* | 1/2003 | Giustina et al. ............. 370/352 |

FOREIGN PATENT DOCUMENTS

| | | |
|---|---|---|
| KR | 1020020073826 | 9/2002 |

* cited by examiner

SYSTEM FOR EMBODYING PROTOCOL IN GATEWAY GPRS SUPPORTING NODE AND METHOD THEREOF

CROSS REFERENCE TO RELATED APPLICATION

This application claims priority to and the benefit of Korea Patent Application No. 2002-81677 filed on Dec. 20, 2002 in the Korean Intellectual Property Office, the entire content of which is incorporated herein by reference.

BACKGROUND OF THE INVENTION (a) Field of the Invention

The present invention relates to a protocol embodying system and method in the GGSN. More specifically, the present invention relates to a protocol embodying system and method in the GGSN for performing routing by using an IP layer.

(b) Description of the Related Art

The GGSN (gateway GPRS supporting node) represent a node for linking a GPRS internal network and an external public network in the GPRS (general packet radio service.) All the packets transmitted by a mobile station are provided to the external network through the GGSN, and all the packets on the external network are transmitted to the mobile station through the GGSN.

Therefore, the GGSN functions as a gateway for performing routing between the internal network and the external network.

FIG. 1 shows a stack of an inner protocol of the GGSN.

As shown in FIG. 1, the stack of an inner protocol of the GGSN is classified as a part for the GPRS network and a part for the PDN (public data network), and the upper IP (Internet protocol) located between the GPRS network and the PDN performs the routing function between the two networks.

First, as to the protocol configuration of the part of the GPRS network, the GTP (GPRS tunneling protocol)-U is a protocol for tunneling user packets and transmitting and receiving them in the GPRS network.

The GTP-U uses the UDP (user datagram protocol) for a lower transmit layer protocol, and uses a lower IP for network layers GPRS-L1 (layer 1) and GPRS-L2 (layer 2).

The GPRS-L1 and GPRS-L2 are configured according to the connected GPRS network, and the ATM (asynchronous transfer mode) or the frame relay is generally used.

The protocol on the PDN side is configured only with the PDN-L1 and PDN-L2 since they are IP packets and can be transmitted with the protocols of the first and second layers L1 and L2 without support of a special protocol when the tunneling is canceled in the GTP-U.

The PDN-L1 and PDN-L2 are configured according to the configuration of the PDN, and an Ethernet interface is generally used so that they may be connected to an edge router.

Data D1 transmitted from the GPRS network is a GTP message tunneled by the GTP. That is, D1 is transmitted to the lower IP through the protocols of the network layer, that is, GPRS-L1 and GPRS-L2, is provided to the GTP-U through the transfer layer protocol used by the GTP, that is, the UDP, and then becomes the GTP message.

After this, the tunneling on the GTP message is canceled by the GTP-U, the GTP message is converted into the IP packet, and the IP packet is transmitted to the upper IP for the purpose of routing. The upper IP performs routing according to the Internet routing rule, transmits the packet to the PDN-L2 which connects the PDNs when an arrival address of the packet is given to a node on the PDN, and the packet is finally provided to the outside through PDN-L1.

It is therefore known from the above description that two IP layers are provided in order to connect the GPRS network and the PDN.

The lower IP layer functions as a protocol of the network layer for transmitting the GTP message, and the upper IP layer functions as a protocol of the network layer for routing the IP packet that is passed through the tunnel.

That is, the lower IP processes the GTP message and the upper IP processes the IP packet while the two IPs are concurrently provided in a single system.

The two IP layers have the same performance procedure and logic even through they respectively process the GTP message and the IP packet.

Further, the IP layer is managed in the so-called stateless format that manages no status of user instances. Therefore, it may increase complexity of the system to embody two IP layers in a single system.

As described above, it is needed for the stack of the inner protocol of the conventional GGSN to separately process two IP layers in order to perform a process for outputting the data D1 transmitted from the GPRS network to the outside.

Accordingly, the prior art problematically increases the complexity since two IP blocks managed in the stateless status are embodied when the GGSN performs routing between the GPRS network and the PDN.

SUMMARY OF THE INVENTION

It is an advantage of the present invention to provide a protocol embodying system and method in the GGSN for reducing complexity of system realization by allowing the GGSN to perform routing between the GPRS network and the PDN through a single IP layer.

In one aspect of the present invention, a protocol embodying system in the GGSN including a GPRS (general packet radio service) network which includes protocols of first and second network layers, and respective protocols of a transfer layer and the GPRS tunneling, and converts user data into IP packets and IP packets into user data; and a PDN (public data network) which is connected to the GPRS network, and uses the protocols of the first and second layers to transmit the IP packets to the outside or the GPRS network. The system comprises an IP layer, provided between the GPRS network and the PDN, for performing routing between the two networks, and performing routing between the protocols of the first and second network layers and the transfer layer protocol on the GPRS network; and a virtual driver provided on the lower part of the IP layer, connected to the protocol of the GPRS tunneling provided to the upper part of the IP layer on the GPRS network, and being operable as the lower interface of the IP layer.

The virtual driver is connected to the IP layer so that the IP packets are output to the PDN through the protocols of the first and second layers of the PDN when the data transmitted from the GPRS network are passed through the protocols of the first and second network layers and converted into the IP packets through the IP layer, the transfer layer, and the GPRS tunneling.

The virtual driver is connected to the IP layer so that the IP packets are output to the GPRS network through the tunneling protocol of the GPRS network, the transfer protocol, the IP layer, and the protocols of the first and second layers when the IP packets transmitted from the PDN are transmitted to the IP layer through the protocols of the first and second layers.

The virtual driver performs a reporting process with the IP in advance in order to process the dynamic and static addresses of the mobile stations belonging to the GGSN during the process of transmitting the IP packets provided from the PDN to the GPRS network.

In another aspect of the present invention, a protocol embodying method in the GGSN comprises: (a) when receiving a packet at a GGSN from a GPRS network, transmitting a message tunneled through protocols of first and second layers of the GPRS network to an IP, allowing tunneling of the tunneled message to be canceled at a GPRS tunneling protocol through a protocol of a transfer layer according to routing of the IP, and generating an IP packet; (b) transmitting the IP packet generated in (a) to the IP through a virtual driver, and allowing the IP to transmit the IP packet to a corresponding node on the PDN; and (c) allowing the PDN which has received the IP packet in (b) to output the IP packet to the outside through protocols of the first and second layers.

In still another aspect of the present invention, a protocol embodying method in the GGSN comprises: (a) when receiving an IP packet at a GGSN from a PDN (public data network), transmitting the IP packet to an IP through protocols of first and second layers; (b) transmitting the IP packet transmitted to the IP in (a) to a virtual driver, and allowing the virtual driver to transmit the IP packet to a GPRS tunneling protocol of the GPRS network; and (c) converting the IP packet transmitted to the GPRS tunneling protocol in (b) into a tunneled message, and outputting the tunneled message to the GPRS network through a transfer layer protocol, the IP, and protocols of the first and second layers.

The step of allowing the virtual driver to transmit the IP packet to the IP in (b) comprises performing a reporting process with the IP in advance so that the virtual driver may process dynamic and static addresses of mobile stations belonging to the GGSN.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 2:
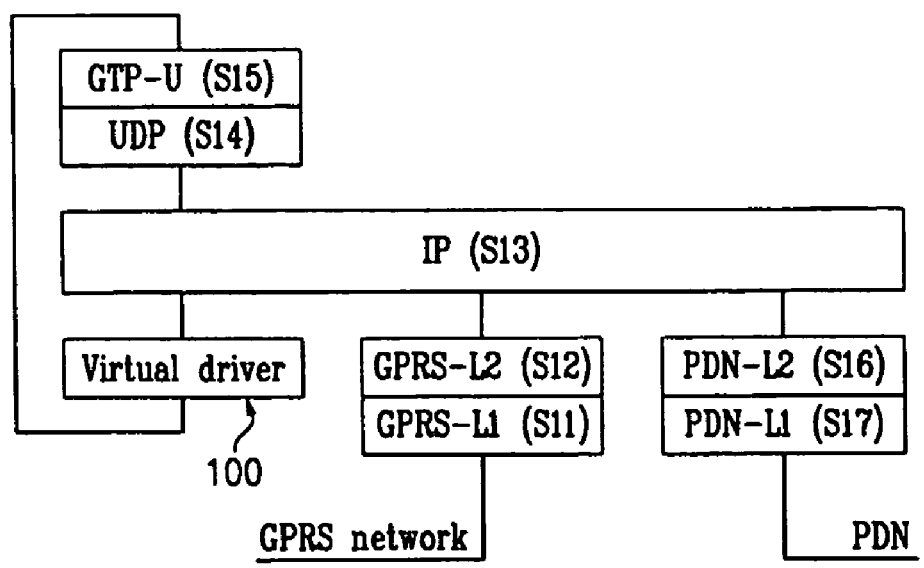
FIG. 2 shows a protocol embodied system in the GGSN according to a preferred embodiment of the present invention.

FIG. 2 shows a protocol embodied system in the GGSN according to a preferred embodiment of the present invention.

As shown, the protocol stack configuration according to the preferred embodiment of the present invention comprises a GPRS-L1, a GPRS-L2, a UDP, a GTP-U, an IP, and a virtual driver 100 on the GPRS network side, and comprises a PDN-L1 and a PDN-L2 on the PDN side.

The previously described GPRS-L1, GPRS-L2, UDP, GTP-U, PDN-L1, and PDN-L2 will not be described.

Figure 1:
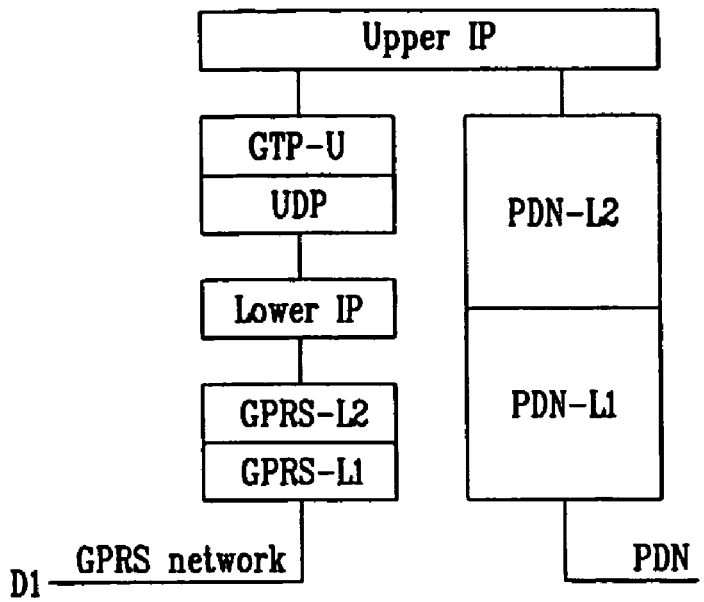
FIG. 1 shows a stack of an inner protocol of the GGSN.

Comparing FIG. 1 to FIG. 2, the IP layers are reduced to one IP layer in the GPRS network side, and the virtual driver 100 is added compared to FIG. 1.

The virtual driver 100 is provided on the lower part of the IP layer, and connects the upper part and the lower part of the IP layer.

That is, the virtual driver 100 is operated as a network interface at the lower part of the IP layer, and is connected to the GTP-U layer on the upper part of the IP layer.

An operation of the protocol embodied system in the GGSN will now be described with reference to drawings.

Figure 3:
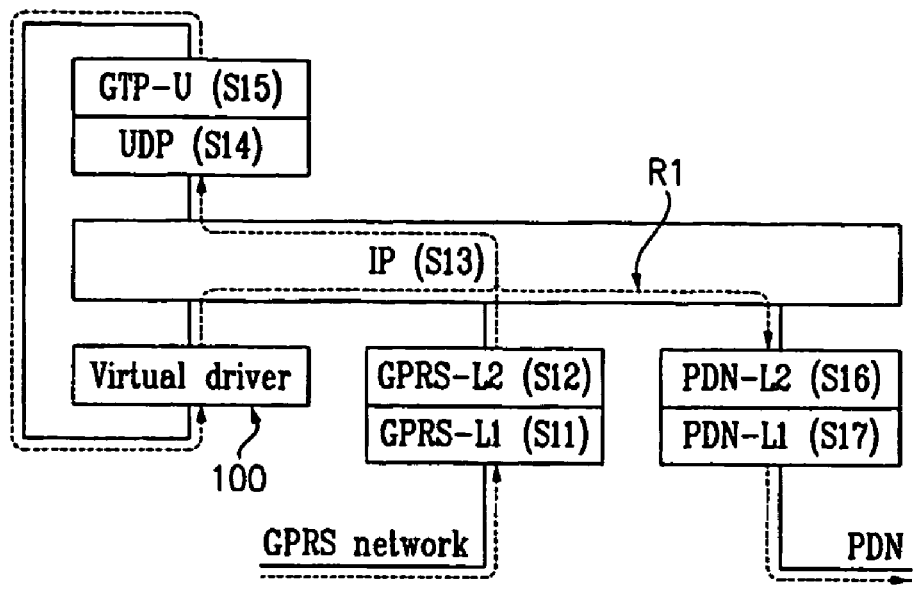
FIG. 3 shows a data flow R1 when the data starting from the GPRS network are output to the PDN.

FIG. 3 shows a data flow R1 when the data starting from the GPRS network are output to the PDN.

When the data are provided to the GGSN from the GPRS network, the data are transmitted to the IP through the GPRS-L1 and GPRS-L2, and the data having passed through the IP are the GTP message tunneled by the GTP.

Since the destination of the GTP message is the GGSN, the GTP message is transmitted to the GTP-U through the UDP which is a protocol of the transfer layer of the upper part of the IP according to the routing principle of the IP.

The tunneling of the GTP message provided to the GTP-U is canceled, the message is converted into the IP packet, and it is transmitted to the virtual driver 100. The virtual driver 100 then transmits the IP packet to the IP.

The IP checks which node in the PDN will be communicated by the mobile station according to the arrival address of the IP packet, and transmits the IP packet to the PDN-L2 of the PDN.

The IP packet transmitted to the PDN-L2 is output to the PDN through the PDN-L1.

Figure 4:
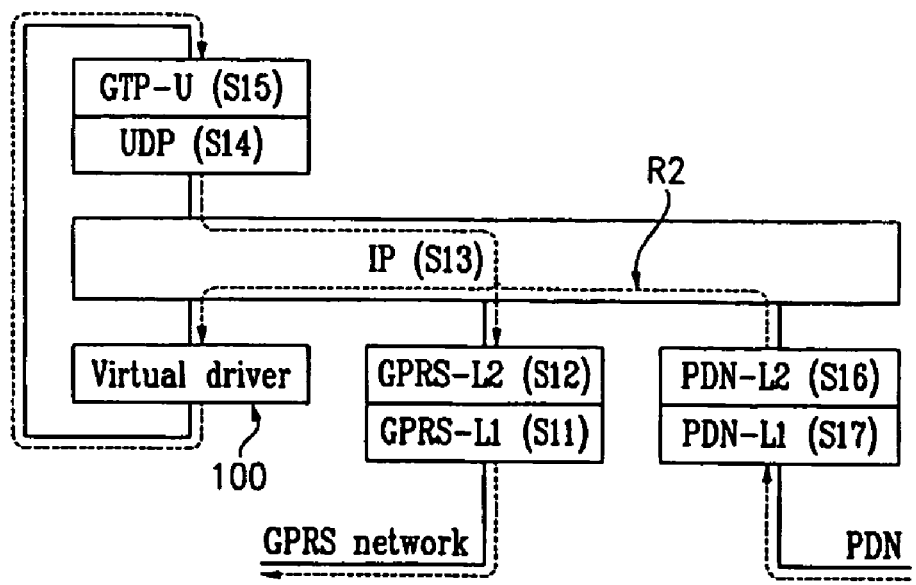
FIG. 4 shows a data flow R2 when the IP packet starting from the PDN are output to the GPRS network.

Next, FIG. 4 shows a data flow R2 when the IP packet starting from the PDN are output to the GPRS network.

The packet provided to the GGSN from the PDN is transmitted to the IP through the PDN-L1 and the PDN-L2. In this instance, the packet transmitted to the IP is the IP packet used on the Internet.

Since the destination of the IP packet is the mobile station, the IP packet is transmitted to the virtual driver 100 by the IP. Then, the virtual driver 100 performs a reporting process with the IP in advance on the dynamic and static addresses of the mobile station belonging to the GGSN.

The above-described reporting process between the virtual driver 100 and the IP is performed when the virtual driver 100 is initially installed on the lower part of the IP.

The virtual driver 100 transmits the IP packet to the GTP-U of the GPRS network, and the GTP-U performs tunneling on the IP packet to generate a GTP message, and transmits the GTP message to the IP through the UDP.

In this instance, since the destination of the GTP message is the SGSN in the GPRS network, the GTP message is finally output to the GPRS network through the GPRS-L2 and the GPRS-L1 from the IP.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Since the protocol embodied system in the GGSN installs the virtual driver on the lower part of the IP, and appropriately connects the upper part and the lower part of the IP by the virtual driver, the system requires one IP, and its embodied structure becomes simpler compared to the conventional one.

What is claimed is:

1. A protocol embodying system converting user data into IP packets and converting IP packets into user data for mobile station communications across various networks, the protocol embodying system in GGSN (gateway GPRS supporting node) including a GPRS (general packet radio service) network which includes protocols of first and second network layers, and a protocol of a transfer layer wherein a PDN (public data network) is connected to the GPRS network in which the PDN uses the protocols of the first and second layers to transmit the IP packets to the GPRS network, the protocol embodying system comprising:

an IP layer provided between the GPRS network and the PDN, for performing inter-network routing between the two networks, and performing intra-network routing between the protocols of the first and second network layers and the transfer layer protocol on the GPRS network;

a GPRS tunneling protocol unit (GTP-U) interfaced to the IP layer, the GTP-U converting the IP packets into tunnel messages using a GPRS tunneling protocol and intra-network transmitting the tunnel messages using the IP layer between the GTP-U and the GGSN; and a virtual driver provided on the lower part of the IP layer for performing inter-network routing of IP packets to the PDN via the IP layer and performing routing IP packets to the GTP-U from the virtual driver.

2. The protocol embodying system of claim 1, wherein the virtual driver is connected to the IP layer so that the IP packets are output to the PDN through the protocols of the first and second layers of the PDN when the data transmitted from the GPRS network are passed through the protocols of the first and second network layers and converted into the IP packets through the IP layer, the transfer layer, and the GPRS tunneling.

3. The protocol embodying system of claim 1, wherein the virtual driver is connected to the IP layer so that the IP packets are output to the GPRS network through the tunneling protocol of the GPRS network, the transfer protocol, the IP layer, and the protocols of the GPRS network when the IP packets transmitted from the PDN are transmitted to the IP layer through the protocols of the first and second layers of the PDN.

4. The protocol embodying system of claim 1, wherein the virtual driver performs a reporting process with the IP in advance in order to process the dynamic and static addresses of the mobile stations belonging to the GGSN during the process of transmitting the IP packets provided from the PDN to the GPRS network.

5. A protocol embodying method in a GGSN gateway GPRS supporting node) converting user data into IP packets and converting IP packets into user data for mobile station communications across various networks, comprising:

when receiving a first data unit at a GGSN from a GPRS (general packet radio service) network, transforming the first data unit into first tunneled message, and intra-network transmitting the first tunneled message using protocols of first and second layers of the GPRS network through an IP layer to a GPRS tunneling protocol unit (GTP-U);

allowing tunneling of the first tunneled message to be canceled at the GTP-U using a protocol of a transfer layer so that a first IP packet is generated from the first tunneled message to be directed to a virtual driver;

inter-network transmitting the first IP packet to the IP layer from the virtual driver, and allowing the IP layer to inter-network transmit the first IP packet to a corresponding node on the public data network (PDN);

allowing the PDN to output the received first IP packet to the outside through protocols of the first and second layers and to inter-network transmit a second IP packet to the IP layer; and inter-network receiving the second IP packet from the IP layer with the virtual driver.

6. A protocol embodying method in a GGSN (general packet radio service) converting user data into IP packets and converting the IP packets into user data for mobile station communications across various networks, comprising:

inter-network receiving using a virtual driver of the GGSN an emitted IP packet from a PDN (public data network) from allowing the virtual driver to transmit the emitted IP packet to a GPRS tunneling protocol unit (GTP-U) of the GPRS (general packet radio service) network;

converting the transmitted IP packet into a tunneled message; and intra-network outputting the tunneled message to the GPRS network through the IP layer using protocols of the first and second layers, wherein the tunneled message is converted into user data through the transfer layer, the IP layer, and the protocols of the first and second layers.

7. The protocol embodying method of claim 6, further comprising the step of allowing the virtual driver to inter-network transmit the IP packet through the IP layer after the virtual driver performs a reporting process with the IP layer in advance so that the virtual driver may process dynamic and static addresses of mobile stations belonging to the GGSN.

8. The protocol embodying method of claim 5 further comprising:

allowing the virtual driver to perform routing of the second IP packet from the outside to the GTP-U;

converting the second IP packet into a second tunneled message using the GTP-U and intra-network transferring the second tunneled message through the IP layer to the GPRS network; and transforming the converted second tunneled message into a second data unit using the GPRS network.

9. The protocol embodying method of claim 6 further comprising:

when acquiring another user data at the GGSN from the GPRS network, intra-network sending out another message from the GGSN by tunneling the another user data into the another message using protocols of first and second network layers of the GPRS through the IP layer to the GTP-U, allowing tunneling of the another tunneled message to be canceled at the GTP-U to generate another IP packet to be directed to the virtual driver and inter-network routing the another IP packet through the IP layer with the virtual driver; and inter-network transmitting the another IP packet through the IP layer using the virtual driver, and allowing the IP layer to inter-network transmit the another IP packet to a corresponding node on PDN.

* * * * *